(12) United States Patent
Eshraghian

(10) Patent No.: US 7,903,685 B2
(45) Date of Patent: Mar. 8, 2011

(54) SYSTEM AND METHOD FOR REFORMATTING DATA

(75) Inventor: Hamed Eshraghian, Lexington, MA (US)

(73) Assignee: Starent Networks LLC, Wilmington, DE (US)

( * ) Notice: Subject to any disclaimer, the term of this patent is extended or adjusted under 35 U.S.C. 154(b) by 1579 days.

(21) Appl. No.: 10/860,365

(22) Filed: Jun. 3, 2004

(65) Prior Publication Data

US 2005/0030982 A1    Feb. 10, 2005

Related U.S. Application Data

(60) Provisional application No. 60/475,521, filed on Jun. 3, 2003.

(51) Int. Cl.
*H04J 3/16* (2006.01)
(52) U.S. Cl. ............ 370/466; 370/360; 711/167; 710/71
(58) Field of Classification Search .................. 370/321, 370/366, 360, 375, 383, 353, 354, 371, 372, 370/373, 377, 386, 389, 391, 399, 428, 362, 370/395, 400, 402, 401, 503, 466, 476, 230, 370/545, 413; 710/71, 2, 38; 341/100, 101; 379/93.05, 93.06, 93.07, 93.08, 93.09; 709/250; 365/219, 230.04; 711/167, 109
See application file for complete search history.

(56) References Cited

U.S. PATENT DOCUMENTS

| | | | | |
|---|---|---|---|---|
| 5,058,051 A | * | 10/1991 | Brooks | 711/167 |
| 5,212,686 A | * | 5/1993 | Joy et al. | 370/417 |
| 5,473,577 A | | 12/1995 | Miyake et al. | |
| 5,493,535 A | * | 2/1996 | Cho | 365/230.04 |
| 5,796,733 A | * | 8/1998 | Norris | 370/366 |
| 5,818,834 A | | 10/1998 | Skierszkan et al. | |
| 5,841,771 A | * | 11/1998 | Irwin et al. | 370/360 |
| 5,878,045 A | * | 3/1999 | Timbs | 370/466 |
| 6,381,239 B1 | * | 4/2002 | Atkinson et al. | 370/362 |
| 6,529,510 B1 | | 3/2003 | Lee | |
| 6,684,275 B1 | * | 1/2004 | Goldstein | 710/71 |
| 2003/0123389 A1 | * | 7/2003 | Russell et al. | 370/230 |
| 2004/0073714 A1 | * | 4/2004 | McClary et al. | 709/250 |
| 2006/0182136 A1 | * | 8/2006 | Itai | 370/412 |
| 2007/0130246 A1 | * | 6/2007 | Lau et al. | 709/200 |

* cited by examiner

*Primary Examiner* — Aung S Moe
*Assistant Examiner* — Vinncelas Louis
(74) *Attorney, Agent, or Firm* — Wilmer Cutler Pickering Hale and Dorr LLP

(57) ABSTRACT

A converter for converting serial (e.g. TDM) data streams into parallel (e.g. cell) data is presented. Conversion from cell to TDM format is also disclosed. Methods for converting between serial and parallel data formats are provided. In some applications, communication data streams of digital data may be captured, processed, and stored in one or more of the serial and cell data formats.

18 Claims, 5 Drawing Sheets

SYSTEM AND METHOD FOR REFORMATTING DATA

CROSS-REFERENCE TO RELATED APPLICATIONS

This application claims the benefit under 35 U.S.C. 119(e) of U.S. Provisional Patent Application No. 60/475,521, filed on Jun. 3, 2003, entitled TDM to Cell Conversion, which is hereby incorporated by reference.

TECHNICAL FIELD

The present application generally relates to data processing, and more particularly, to systems and techniques for reformatting digital data.

BACKGROUND

In digital communication applications, for example, Time Division Multiplexing (TDM) systems, voice data is converted from analog to digital form, and binary digits (bits) are sent over a communication network. The bits of digitized voice data are streamed serially over multiple physical communication network lines in organized formats, understandable to devices coupled to the communication network lines.

FIG. 1 illustrates an example of TDM communication data in which serial streams of digital voice data 100 are carried over a number of communication lines. Each line or stream 100 is logically divided into a sequence of frames 110, and each frame 110 includes a sequence of channels 120. Information is delivered from source to destination using bytes 102, each of which includes 8 bits 104 of data. A frame 110 contains 128 channels 120. The channels 120 are designated Channel 0, Channel 1, ..., Channel 126, and Channel 127. A given telephone conversation will occupy one of the channels, e.g. Channel 1 of Stream No. 2. Note that each channel is allotted one byte in each frame 110 of its stream. Therefore, a conversation carried on a channel (e.g. Channel 1) is segmented into byte-sized parts that share a same stream (e.g. Stream No. 2) as 127 other conversations occupying the other 127 channels in the stream. In all, a system carrying 24 streams of data can handle (24 streams×128 conversations/stream)=3072 conversations at the same time, albeit not continuous. That is, for each streaming frame of data 110, 128 conversations are being carried (in real time to their participants) but are physically sharing the frame 110 among the 128 channels 120. In one example, the data transmission frequency is 8.192 MHz with a period of 122 nsec.

While TDM is a popular format for data transmission, it is not always possible or convenient to receive digitized voice data according to the TDM serial streaming format described above. In some cases the hardware receiving, forwarding, or processing the data streams is not adapted for the TDM format. Accordingly, for any of several reasons, it may be desirable to reformat the digital voice data streams into another useful format.

SUMMARY

One aspect of the present disclosure is directed to a system for converting at least one stream of data into a data cell format, including an asynchronous queue, receiving data from the at least one stream of data at a first clock rate, and providing an asynchronous queue output at a second clock rate; a memory array receiving the output of the asynchronous queue and providing a memory array output; and a register taking the memory array output and providing a plurality of bits in parallel corresponding to the data cell format.

Another aspect of the present disclosure is directed to a method for converting at least one stream of data into a data cell format, receiving data from the at least one stream of data at a first clock rate into an asynchronous queue, and providing an asynchronous queue output at a second clock rate from the asynchronous queue; placing the output of the asynchronous queue into a memory array, and providing a memory array output from the memory array; and receiving the memory array output at a register, and providing from the register a plurality of bits in parallel corresponding to the data cell format.

Yet another aspect of the present disclosure is directed to a converter for converting data from a first format into a second format, elements for receiving at least one stream of serial data corresponding to the first data format; elements for storing the at least one stream of serial data, a plurality of bits of the stream of serial data being stored in parallel; and elements for reading the stored data in the storing elements onto a parallel bus corresponding to the second data format.

BRIEF DESCRIPTION OF THE DRAWINGS

For a fuller understanding of the nature and objects of the present disclosure, reference should be made to the following detailed description, in connection with the accompanying drawings, in which the same reference numerals are used to indicate the same or similar parts, wherein.

DETAILED DESCRIPTION

As discussed briefly above, TDM voice data is transmitted in serial streams on a plurality of lines. A system and method for reformatting the TDM data into another useful format is presented in detail below, and specifically with reference to a particular exemplary embodiment. It should be appreciated that other formats and embodiments are also possible using the same inventive principles, and such modifications and extensions may be comprehended by those practiced in the field.

Figure 2:
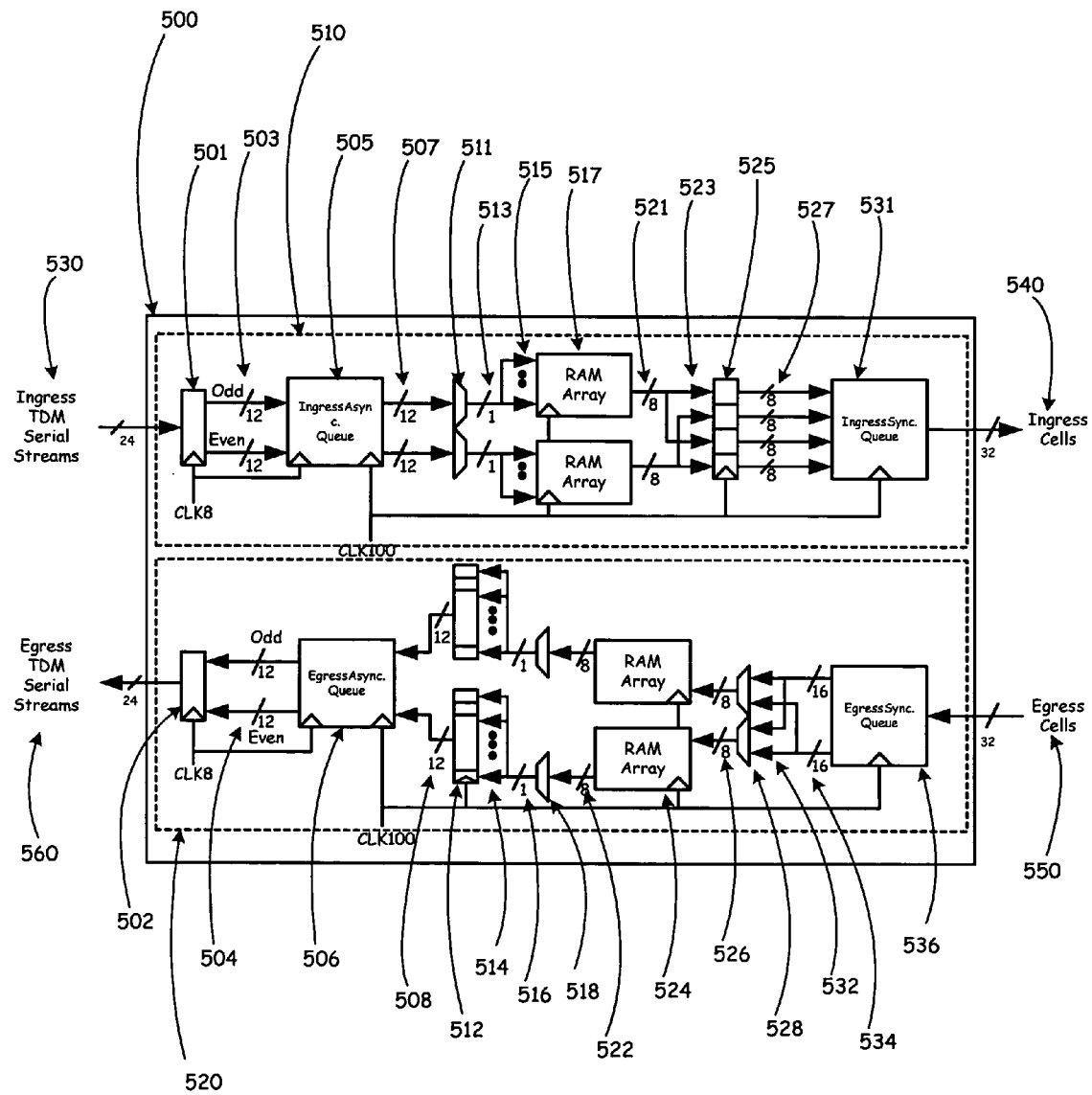
FIG. 2 illustrates an exemplary embodiment of a serial-to-cell and cell-to-serial converter according to the present invention.

FIG. 2 is a block diagram of an exemplary embodiment of a system for converting serial TDM streams into cell data blocks, and cell data blocks into serial TDM streams. Separate parts of the system 500 can be used for achieving each type of reformatting. In the present example, circuit 510 reformats the data from serial TDM streams into parallel cell format, and circuit 520 reformats data from parallel cell format into serial TDM format. Each of the parts 510, 520 of the system 500 could be implemented separately or disposed on individual circuit boards or integrated circuits. The system 500 is suited for use in a communication system that interacts with other systems using the TDM format, whereby TDM streams arrive at the ingress 530, are converted to cell format, processed, then returned to TDM streams that are sent out the TDM egress path 560.

Figure 1:
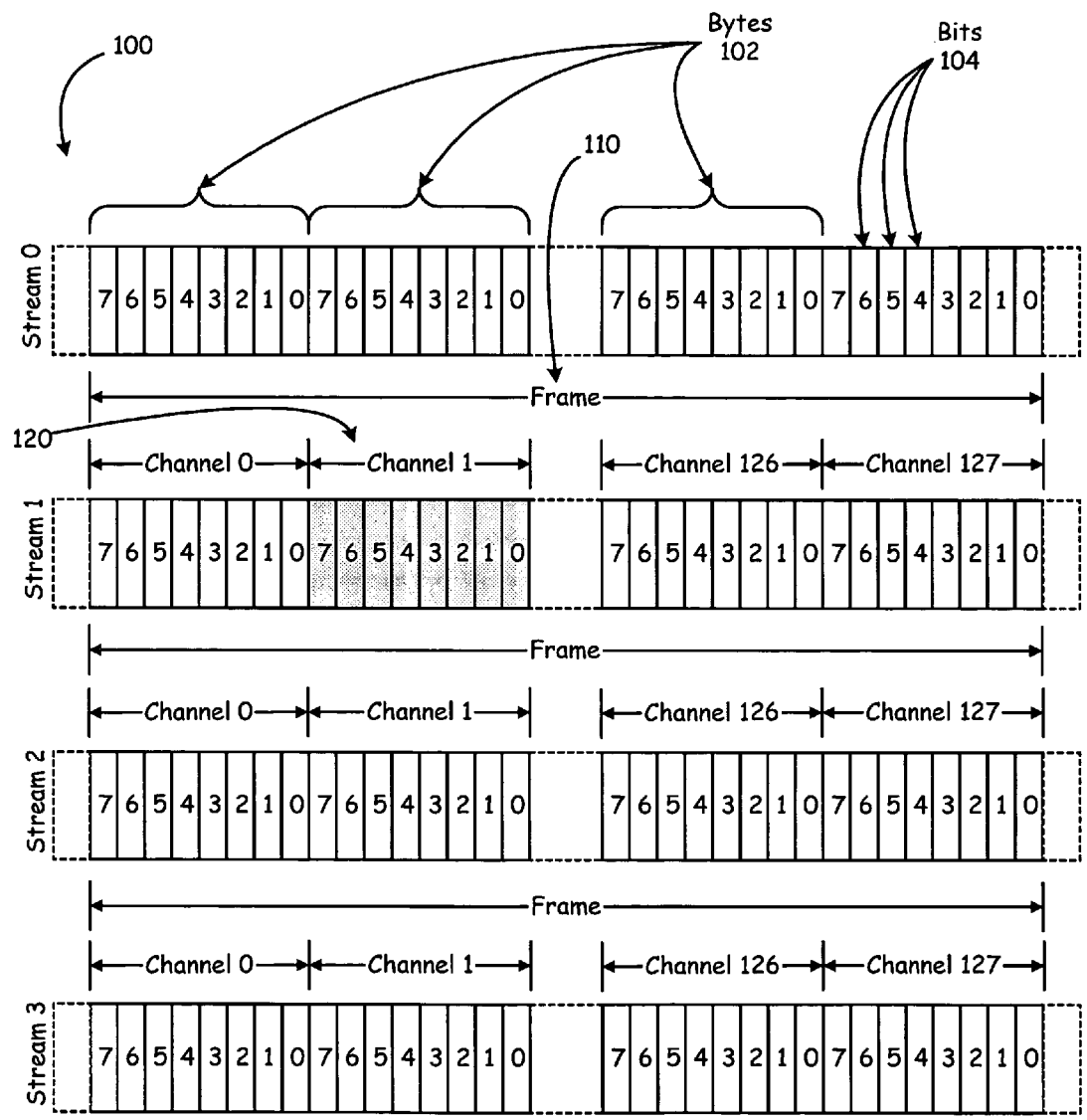
FIG. 1 illustrates several frames of serial TDM data according to the related art.

Circuit 510 converts data arriving in TDM stream format at ingress 530 to cell format at ingress cell path line 540. As described earlier with respect to FIG. 1, 24 streams of TDM data (in 24 separate serial streams) are presented at TDM ingress 530. This is graphically represented in FIG. 2 by the slash and the numeral "24" on the ingress line. The incoming data at 530 is presented at a clock "CLK8" frequency of 8.192 MHz, i.e., 24 bits arrive every 122 nsec. Deinterleaver 501 provides two 12-bit streams of data 503, one stream being for the odd numbered streams and another stream for the even numbered input streams. The odd and even bit streams are placed into ingress asynchronous queue 505.

Operations downstream of the ingress asynchronous queue 505 are carried out at a higher frequency of 100 MHz ("CLK 100"). The 12-bit wide odd and even streams 507, now clocked at 100 MHz, are multiplexed by multiplexers 511 to provide a corresponding pair of single output streams 513 that are delivered to RAM arrays 517 through parallel inputs 515. The first words read contain bit 7 of channel 0 of each of the 24 incoming TDM streams, and are written to sequential addresses of RAM array 517 at bit position 6. The next words read contain bit 6 of channel 0 of all 24 TDM streams, and are also written to sequential addresses of RAM array 517 at bit position 6. This process is repeated until bits 0 of the TDM streams are written to sequential addresses of RAM array 517 at bit position 0. Therefore, the TDM serial data at 530, which is taken in by circuit 510 at 8 MHz, is delivered to RAM arrays 517 in serial fashion at 100 MHz. RAM arrays 517 will be discussed in more detail below, and in some embodiments provide space, cost, and other design savings and formatting advantages over traditional flip-flop designs for converting data from a serial to a parallel format.

Using RAM arrays 517 provides a cost and space saving, which can be important in integrated circuit applications. To perform the functions described above without the RAM arrays 517 of the present invention, 96 flip-flops (12×8) would be required for each RAM array according to conventional design methods. However, the footprint of the RAM arrays 517 is much smaller, and is equivalent to the footprint of about 8 flip-flops only, providing a substantial area savings according to the present illustrative example. The RAM arrays may be loaded serially (written) and then read in parallel. Of course, this process is adaptable for sizes of arrays and words other than those given in this example.

RAM arrays 517 output odd and even bytes 521 to register 525, and the contents of all RAM arrays 517 are read in parallel, and the bytes from the odd and even sections are combined to form a 16-bit word. This word is combined with the output of the following RAM read to create a 32-bit word that is sent to ingress synchronous queue 531 using register 525. Register 525 is a 32-bit (8×4) register, clocked at 100 MHz, and provides 32 bits in parallel to ingress synchronous queue 531. Ingress synchronous queue 531 then outputs a 32-bit wide parallel cell of data at ingress cell path 540. The ingress cell path 540 can be used to provide cell data to components of a communication system that processes data in cell format rather that TDM format. When such a communication system has received or processed the cell data, it may return the cell format data to an external network in TDM serial format using parallel-to-serial circuit 520.

Circuit 520 receives as input egress cells 550, which are 32-bit wide parallel cells written into egress synchronous queue 536 at 100 MHz. Odd and even groups of bytes 534 are provided to multiplexer pair 528. Multiplexers 528 output bytes of data 526 to a pair of RAM arrays 524. The bytes associated with odd and even streams are separated and are written to RAM arrays 524 with a similar placement of bits as was used in the ingress RAM array 517 paths. Each of the two 16×1 RAM word corresponding to bit 7 is then read out starting at address 0 and ending at address 11, thus providing bit 7 of channel 0 for each of the 24 data streams. This process is repeated for the remaining 7 RAM pairs in RAM arrays 524.

RAM arrays 524 output two bytes of data 522, which are multiplexed by multiplexers 518 into two corresponding 1-bit streams 516. The 1-bit streams 516 are provided through 12 line pairs 514 to 12-bit registers 512. Registers 512, clocked at 100 MHz, provide two 12-bit outputs to egress asynchronous queue 506. The cell number, embedded in each cell, is compared with a local counter that tracks the number of the next cell that must be output. If there is no match or the next cell has not arrived yet, 0xFF is sent out for both channels on all 24 streams and an interrupt is generated. Egress asynchronous queue 506 then outputs the two sets (odd, even) of 12 bit data at 8 MHz onto output lines 504. An interleaver 502 places the 24 bits of data (12 odd, 12 even) in the proper order onto egress TDM serial stream lines 560, which is available to as 24 frames to a TDM serial communication system. The TDM serial streams may be sent through digital switches to voice processing systems.

The entire system 500 may be constructed in a field programmable gate array (FPGA) device, or may be otherwise assembled from electronic components on one or more circuit boards or integrated circuits. Also, the system may be enhanced or augmented through the use of other auxiliary circuits and systems (not shown) and accompanying software to operate, control, and process data through the system.

Figure 3:
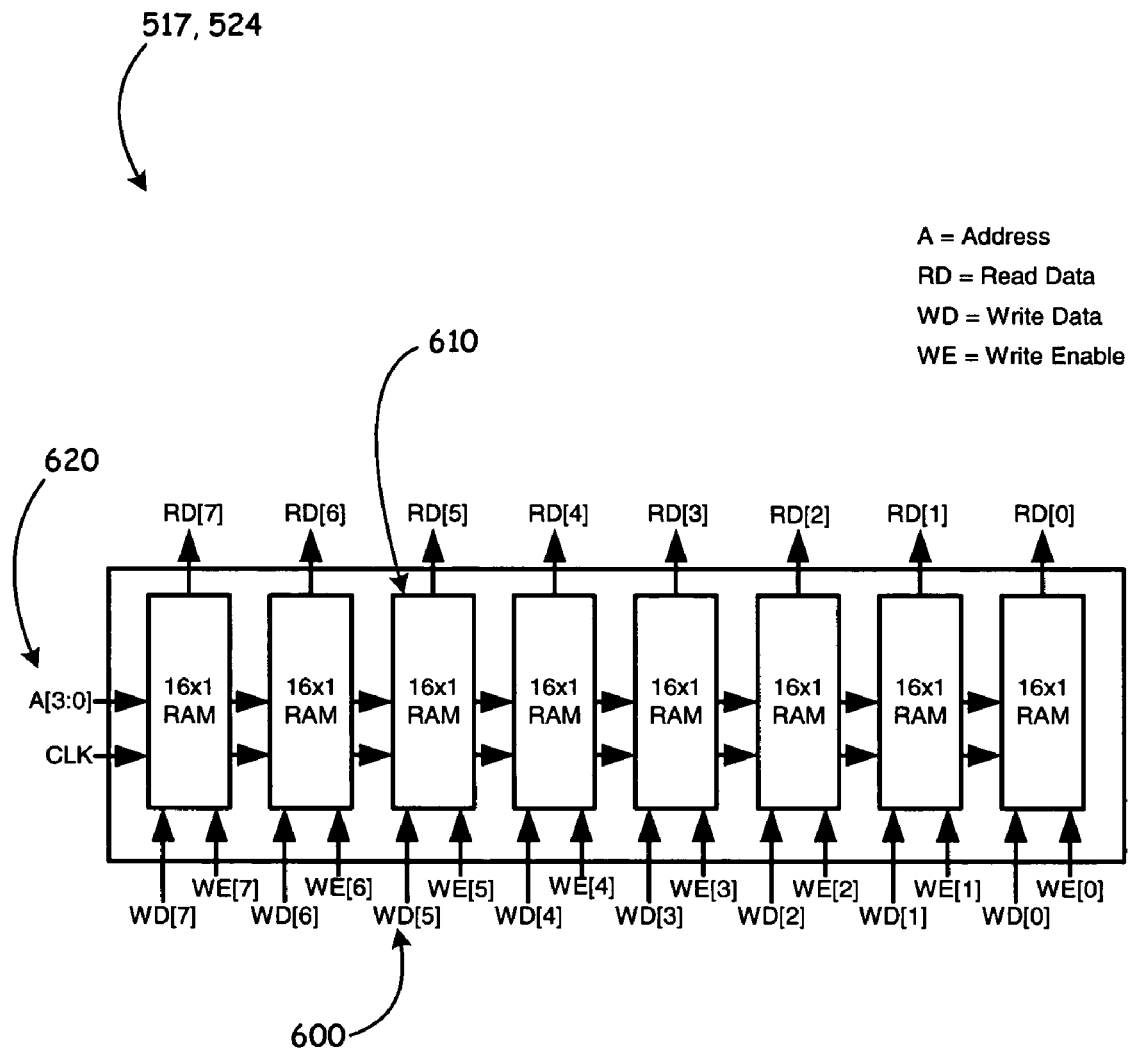
FIG. 3 illustrates an arrangement of RAM array devices.

FIG. 3 illustrates RAM arrays 517, 524, whose function was described above. The RAM arrays 517, 524 in this example are 8-bits wide by 16-bits deep. Compared to equivalent flip-flops, a RAM device takes up less space, and has its addressing functionality built into the RAM array rather than being external to the device, as in a flip-flop array. Eight RAM devices 610 are packaged in each RAM array 517, 524. The lines labeled "A" are a 4-bit addressing input to the array; the lines labeled "WE" indicate write-enable; the lines labeled "WD" indicate write-data; and the lines labeled "RD" indicate read-data. The RAM array also takes a clock "CLK" input (at 100 MHz in the present example). The fact that there are 12 10-nsec cycles of the fast (100 MHz) clock within the 122-nsec period of the slower (8.192 MHz) clock allows the steps described to be carried out on the 24 sets of incoming TDM frames in real time.

Figure 4:
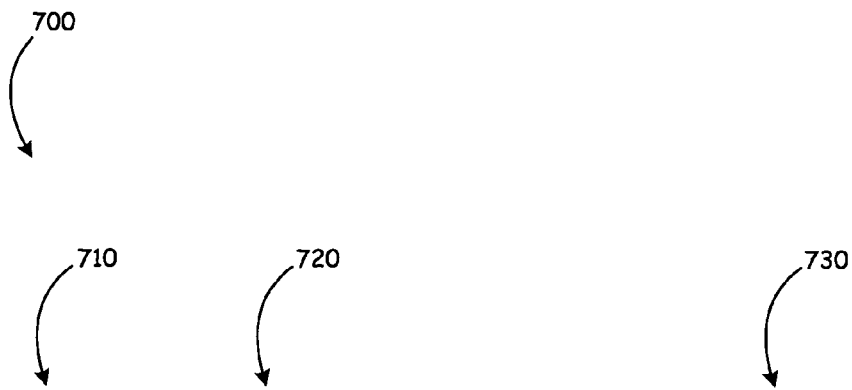
FIG. 4 illustrates an exemplary data cell format.

FIG. 4 illustrates an exemplary data cell format according to one embodiment compatible with the present invention. Each cell 700 carries two channels/bytes of data 720, 730 from each of the incoming 24 TDM data streams. One TDM frame is therefore carried by 64 cells according to the present exemplary cell format. In the figure, "ST" denotes a stream number, and "CH" denotes a channel number within the stream, with "n" being an even number starting with "0". A 2-bit frame number and a 6-bit cell number identifying the cell within the frame are provided in the first byte (byte 0).

Figure 5:
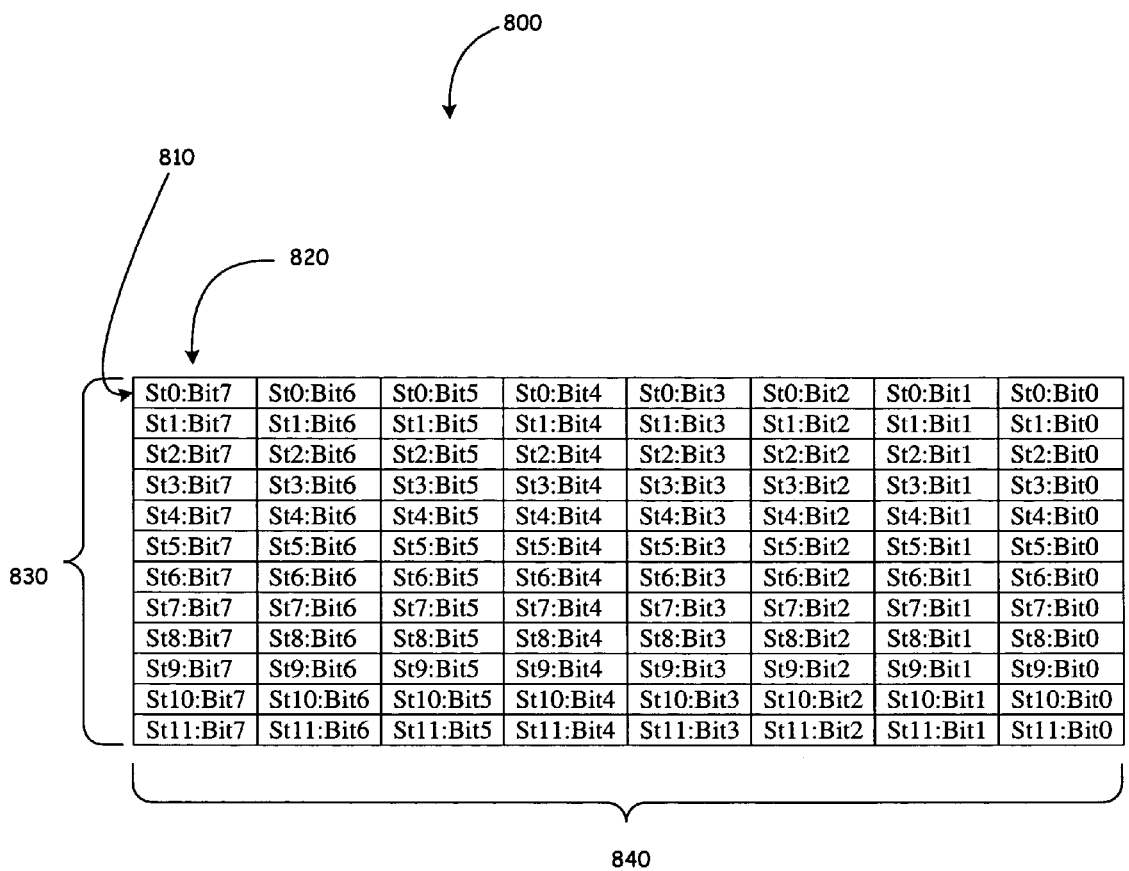
FIG. 5 illustrates an exemplary arrangement of data according to a read-write configuration of the RAM arrays.

FIG. 5 illustrates an exemplary bit placement table for bits in the RAM arrays 517, 524. The cells are written as multiple 32-bit words into the egress synchronous queue 536. The table 800 corresponds to the hardware described in the previous figures, and includes 12 rows 810 and 8 columns 820. The table is filled with the data as indicated by the stream "ST" and Bit numbers, with the order of filling being in columns, from top to bottom (12 bits 830). Conversely, the RAM arrays are read in rows from left to right (8 bits 840).

The system described above in one exemplary embodiment, and the methods for reading, storing, and writing data from a serial TDM stream format to a cell format and back to a serial TDM format are useful in communication applications in which TDM and cell formats are used, and conversion from one form to the other is accomplished. It should be understood that the examples provided are not limiting or inclusive, but rather, the invention, as given by the claims which follow comprehends numerous modifications and augmentations within the same scope.

What is claimed is:

1. A system comprising:
a first interface receiving a first clock signal at a first clock rate;
a second interface receiving a second clock signal at a second clock rate;
an asynchronous queue, receiving a first clock signal from the first interface and the second clock signal from the second interface, receiving data from a plurality of streams of serial TDM data at the first clock rate, and providing a parallel asynchronous queue output at the second clock rate;
a multiplexer receiving the parallel asynchronous queue output and providing a serial multiplexer output;
a memory array, receiving the output of the multiplexer in a serial fashion and providing a memory array output in a parallel fashion; and
a register, receiving the clock signal from the second interface, taking the memory array output and providing a plurality of bits in parallel corresponding to the data cell format at the second clock rate.

2. The system of claim 1, wherein the second clock rate is faster than the first clock rate.

3. The system of claim 1, wherein the memory array comprises at least one RAM device including a plurality of bit places.

4. The system of claim 1, further comprising a synchronous queue that receives the plurality of bits from the register and provides a data cell of output bits.

5. The system of claim 1, wherein the parallel asynchronous queue output includes bits from each of the plurality of streams of data corresponding to a channel and the serial multiplexer output includes at least one word of data corresponding to the bits multiplexed in a serial fashion.

6. The system of claim 1, wherein the plurality of streams of serial TDM data are digital voice data streams on a communication network.

7. The method of claim 1, wherein the method is implemented on a chassis responsible for at least one of receiving, forwarding and processing data streams on a digital voice communication network.

8. The system of claim 1, wherein the plurality of bits in parallel corresponding to the data cell format is used on a chassis responsible for at least one of receiving, forwarding and processing data streams on a digital voice communication network.

9. A method comprising:
receiving serial TDM data from a plurality of streams of serial TDM data at a first clock rate into an asynchronous queue, and providing a parallel asynchronous queue output at a second clock rate from the asynchronous queue;
multiplexing the parallel asynchronous queue output and providing a serial multiplexer output;
placing the serial multiplexer output into a memory array in a serial fashion, and providing a memory array output from the memory array in a parallel fashion at the second clock rate;
receiving the memory array output at a register;
providing from the register a plurality of bits in parallel at the second clock rate; and
providing the plurality of bits in parallel synchronously as output bits.

10. The method of claim 9, wherein the second clock rate is faster than the first clock rate.

11. The method of claim 9, further comprising multiplexing the parallel asynchronous queue output.

12. The method of claim 9, further comprising receiving the plurality of bits at a synchronous queue from the register and providing a data cell of output bits.

13. The method of claim 9, wherein the plurality of bits in parallel at the second clock rate includes identification information of a cell number.

14. The method of claim 9, wherein the plurality of streams of serial TDM data are digital voice data streams on a communication network.

15. A system comprising:
a first interface receiving a first clock signal at a first clock rate;
a second interface receiving a second clock signal at a second clock rate;
an input processor, receiving the first clock signal from the first interface and the second clock signal from the second interface, that receives a plurality of input serial data streams at the first clock rate and outputs a plurality of bits corresponding to the input serial data streams at the second clock rate, the second clock rate being greater than the first clock rate;
a multiplexer taking an input from the output of the input processor and providing a sequential multiplexer output;
a memory array sequentially taking an input from the output of the multiplexer;
a register coupled to the memory array and the second interface and adapted to read at least one word of data content from the memory array in parallel; and
an output processor that receives at least one word of data content from the register in parallel and produces a cell formatted word of data at the second clock rate corresponding to the plurality of input serial data streams.

16. The system of claim 15, wherein the input processor includes an asynchronous queue and the output processor includes a synchronous queue.

17. The system of claim 15, wherein the plurality of input serial data streams are digital voice data streams on a communication network.

18. The system of claim 15, wherein the input processor, multiplexer, memory array, register and output processor are implemented in a chassis responsible for at least one of receiving, forwarding and processing data streams on a digital voice communication network.

* * * * *